Oct. 17, 1967   S. C. W. WILKINSON   3,347,726
METHOD OF FORMING A FLEXIBLE SEAL CONNECTION
BETWEEN LARGE DIAMETER SHAFTS
Filed Jan. 25, 1966   3 Sheets-Sheet 1

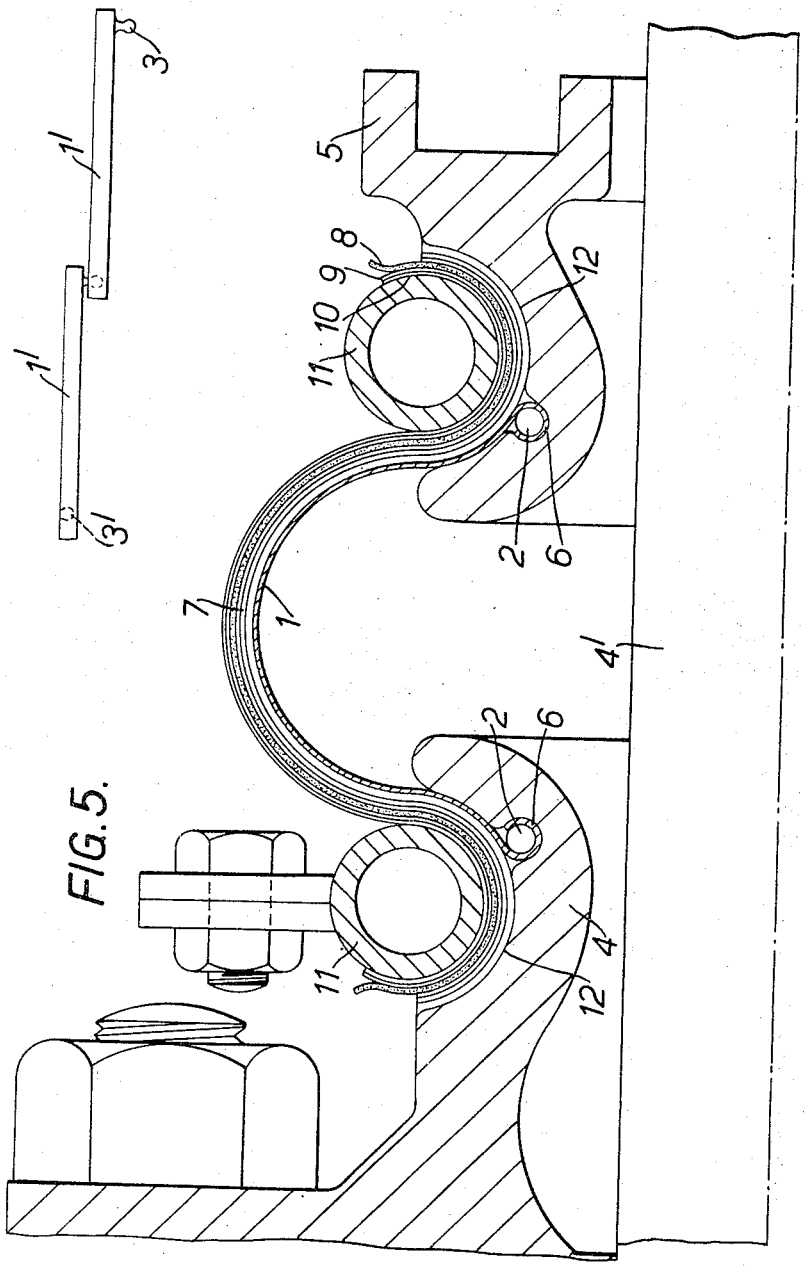

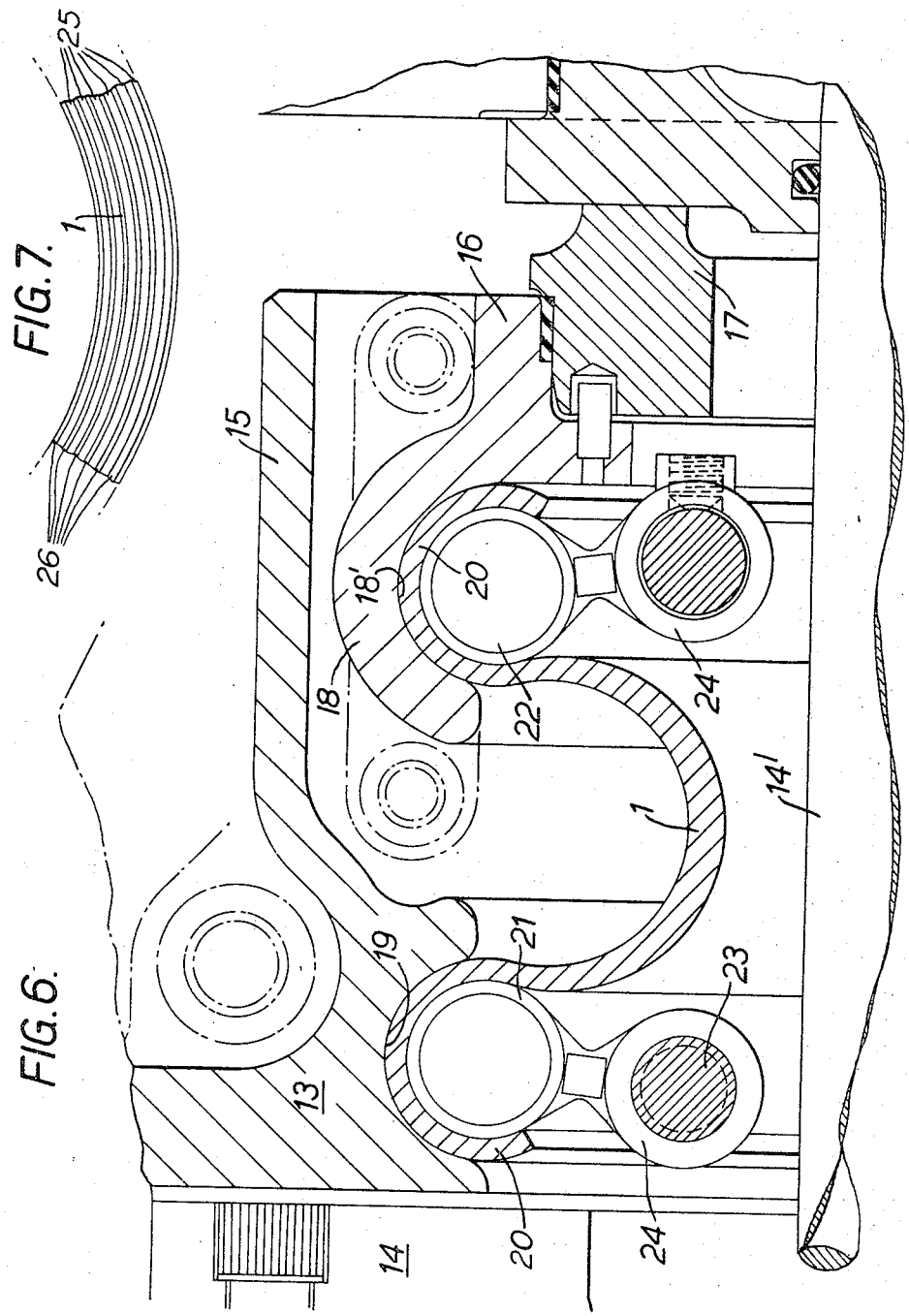

United States Patent Office 3,347,726
Patented Oct. 17, 1967

3,347,726
METHOD OF FORMING A FLEXIBLE SEAL CONNECTION BETWEEN LARGE DIAMETER SHAFTS
Samuel Clifford Walter Wilkinson, Cookham, England, assignor to Crane Packing Limited, Slough, England, a British company
Filed Jan. 25, 1966, Ser. No. 522,910
Claims priority, application Great Britain, May 21, 1965, 21,711/65
7 Claims. (Cl. 156—190)

ABSTRACT OF THE DISCLOSURE

Seal construction for shafts of large diameters, the seal being capable of being applied in situ where limited quantities of exceptionally large seals, as for example, for propeller shafts of ocean liners, are required; the seal being in the form of a flexible ladder-like member having a pair of side members and a plurality of spaced cross-members, the members being flexible and capable of being wrapped around the parts to be sealed and have applied thereto a plurality of sealing layers to provide a composite unitary structure, the composite structure being retained in place by clamping rings or hoops which are tightened around the side parts so that these are forced into sealing engagement with the abutting surfaces of the members being sealed.

*Detaled description*

This invention relates to the formation of bellows, primarily for use in the construction of large mechanical face seals, but such bellows may also be used in forming flexible sections of pipework systems and for other purposes where a flexible cylindrical sealing member is required.

In the case of seals for shafts of large diameters there is seldom a demand for more than two or three seals of any given size and it is therefore not a practical commercial proposition to lay down, for example, special rubber moulds for forming rubber bellows of the required size. Furthermore the normal moulded rubber bellows have to be fitted over the end of the shaft on which the seal is to be mounted and in many cases access to the end of the shaft is impossible; the only way of overcoming this difficulty with existing bellows is to cut through the bellows and weld them up again or bond them in position, which is not a very practical proposition.

In the specification of our U.S. patent application No. 341,714 filed January 31, 1964. we have described and claimed a method of forming bellows in situ by spiral wrapping of flexible layers of sheet metal and of reinforced synthetic resin or similar material. The present invention relates to a further development on the same lines.

According to one feature of the invention bellows formed in situ by spiral wrapping of layers of metal and/or of other material have at least one layer formed by a series of strips which extend in general directions parallel to the axis of the bellows and are connected together at their ends directly or indirectly, for example by circumferentially extending wires or other flexible or articulated connecting members. The layer of strips may thus be likened to a ladder, with flexible wire or other side members and a series of closely spaced, or even overlapping, rungs of metal or other strip. Where the strips are of metal then, as compared with a layer formed from a single strip of metal wound circumferentially this has the advantage that the grain of the material extends in the general direction parallel to the axis, which is better for resisting any tendency to fatigue cracking at the bends in the profile to which the layer is formed. The layer made up of individual strips is also more flexible, i.e. easier to bend round during the wrapping process.

According to a further feature of the invention the cross-section of the bellows taken in a plane containing the axis is in the form of a smooth curve with its convex side facing outwards, i.e. away from the axis. This is the best shape for resisting internal pressure and if the curve is an arc of a circle the pressure stress is taken solely as a tensile stress in the bellows, without any tendency to deform the belows out of shape. Alternatively the cross-section could be an arc of a circle with the convex side inside, even where the pressure is internal, and in this case the stress in the bellows is a compressive one.

According to yet another feature of the invention the two ends of the bellows are secured in grooves of smooth arcuate cross-section which is a tangent to the curve of the bellows profile, so that there is no sudden bend or change of section where the bellows enter the clamping region. The ends of the bellows are clamped in these grooves by hoops of round cross-section, the cross-section having an appropriate diameter to match that of the cross-section of the grooves.

Instead of being bedded in grooves, the ends of the strips could fit over smooth annular surfaces of convex cross-section, being clamped to those surfaces by hoops that have concave inner surfaces .

The strips that go to make up the ladder may be of metal, in which case the feature of the grain of the material extending axially instead of circumferentially is particularly valuable, or they may be a non-metal, for example a synthetic resin such as nylon or an acetal resin. The whole bellows assembly may be made of nonmetallic materials and instead of the strips being secured to wires they could, where they are made of synthetic resin, be moulded with integral interconnecting means, for example a peg on one side and a hole on the other side of each strip. There could be several layers of such strips and the outer layer could still, as in the arrangement described earlier, be clamped by retaining hoops.

Instead of being made of sheet metal or of sheet synthetic resin the strips could be made of fabric-reinforced rubber or of rubberised fabric. Another possibility is for them to be made of metal mesh.

In a further possibility virtually the whole of the bellows assembly could be made of metal, with no interleaving layers of fabric or rubber. The multiple layers of metal strips would overlap and would form a labyrinth seal allowing only small leakage but, better still, an initially liquid sealing compound such as an epoxy resin, is applied to the layers as they are applied, or alternatively, before assembly, the individual strips are dip-coated or powder-coated in a synthetic resin such as polyvinyl chloride or polyethylene, and then the whole bellows structure is heated, for example with a torch, to melt the coatings and fuse them together.

The invention will now be described by way of example with reference to the accompanying drawings, in which:

FIGURE 4 is a scrap view showing an alternative manner of securing together the strips without wires;

FIGURE 5 is a cross-section through one form of bellows suitable for a ship's propeller stern tube;

FIGURE 6 is a view similar to FIGURE 5 showing an alternative construction; and

FIGURE 7 is a scrap section showing the composition of the bellows of FIGURE 6.

Figure 1:
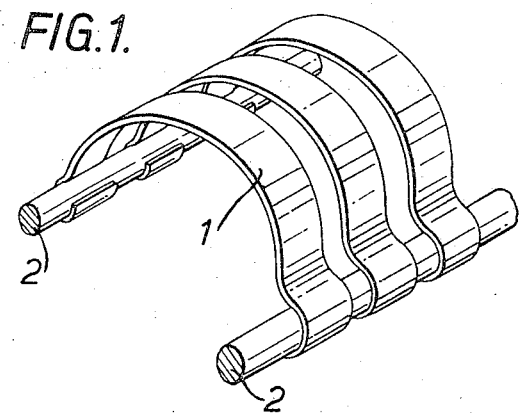
FIGURE 1 is a diagrammatic sketch illustrating a portion of a metal layer for forming the bellows.

Referring first to FIGURE 1, there is shown an extended long flexible body which is made up of a series of strips 1 arranged transversely and secured together by having their ends hooked over longitudinally extending wires 2. In one preferred construction the strips are made of a nickel copper alloy sold under the trademark Monel but they may be moulded from a synthetic resin such as nylon or an acetal resin.

Figure 2:
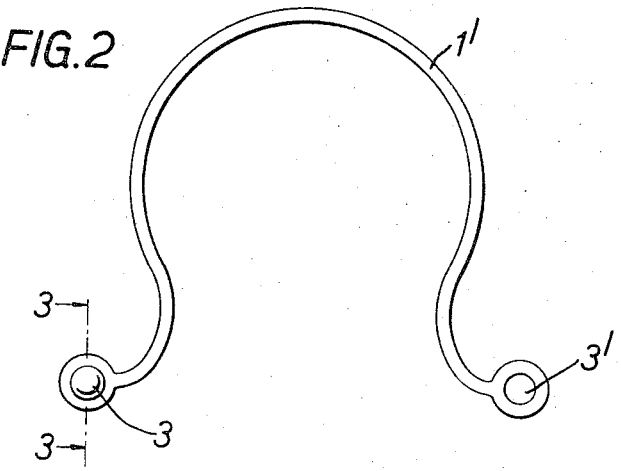
FIGURE 2 is an end elevation of a strip of synthetic resin designed for securing together without separate wires.
Figure 3:
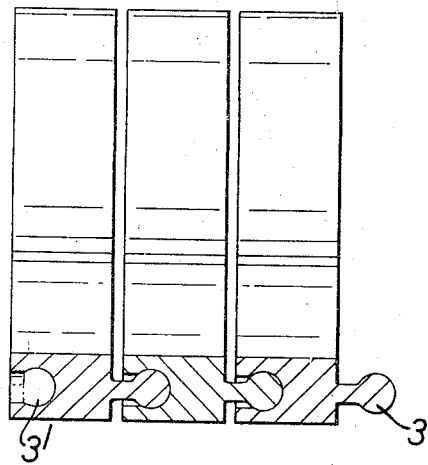
FIGURE 3 is a section on the line 3—3 in FIGURE 2.

The body shown in FIGURE 1 is used as, or in place of, the metal layer in the process of forming bellows described in the specification of the parent U.S. patent application No. 341,714. It has the advantage over the continuous longitudinally extending metal strip of the earlier specification that it is more flexible and easier to apply, and the grain of the metal (where the strips 1 are of metal) extends in the best direction for resisting any tendency to cracking caused by bending to the wave formation that forms the bellows.

Where the strips 1 are of synthetic resin then, instead of being secured together by longitudinally extending wires as in FIGURE 1, they may have integral pegs 3 and sockets 3' as shown in FIGURES 2 and 3, there being a peg at one corner and socket at the other corner of each end of each strip. An alternative possibility is shown in FIGURE 4, the same reference numerals being used. It will be seen that in this case the sockets 3' and the pegs 3 are formed in the faces of the strips 1', near the opposite edges thereof and the strips are connected together by overlapping them in the manner of roof tiles with the peg in the lower face of one strip engaging the socket in the upper face of the adjacent strip.

Although in the example described in the parent specification the bellows had a V-shaped cross-section we now prefer a more rounded shape, and in the example shown in cross-section in FIGURE 5 designed for mounting the seal of the propeller shaft in its stern tube in large and very large ships, the bellows are of roughly semicircular cross-section, with their concave side innermost. The shaft housing is shown at 4 and the carrier at 5 for a non-rotating seal face member (not shown) is to be sealed to it in a manner allowing axial movement of the seal face member. The shaft is shown at 4'. The bellows comprise a number of layers, of which the innermost layer is formed by the body of metal strips 1 on wires 2 that is described above with reference to FIGURE 1. This layer is wrapped around the members 4 and 5 with the wires 2 lying in grooves 6 in the two members. This layer is then followed by a sprially wound layer 7 of polyvinyl chloride or other synthetic resin, reinforced with fabric. The fabric is preferably cut on the bias and is of a knitted type to give the material sufficient ability to stretch for it to follow the required shape. In the example shown the PVC layer extends to three complete turns.

This is then followed by a further layer 8 of metal built up of individual strips, a layer 9 of PVC, and a final layer 10 of metal strips. These last three layers are not applied individually however. The ends of the strips are formed into eyes and are clipped over hoops 11 formed of metal tube, which hoops thus have the same function in relation to the layers 8 and 10 as the wires 2 have in relation to the first layer. The hoops 11 also serve, however, as clamping rings to secure bellows to the members 4 and 5. The hoops are each formed in two, three or more arcuate sections articulated together and provided with means for drawing together their free ends.

The final part of the operation of assembly of the seal thus comprises applying around the PVC layer 7 the complete unit comprising the parts 8, 9, 10 and 11 and then tightening up the rings 11. These rings clamp the ends of the bellows into grooves 12 of arcuate concave cross-section formed in the ends of the members 4 and 5. The smooth arcuate shape of the grooves and of the profile of the hoops 11 ensures that there is no local concentration of stress or danger of kinking at the transition from the smooth free portion of the bellows to the clamped portion.

It will be understood that the bellows described may act not only as a seal but also as a spring, applying an axial force to the seal face carrier 4. In that case, where the seal is in contact with seawater or other corrosive fluids, a suitable material for the metal layers is Monel metal.

FIGURES 6 and 7 show a bellows structure for the same purpose as that of FIGURE 5 but of different construction. Here a ring 13 bolted to the face of the shaft housing 14 of a propeller shaft 14' has an axially extending flange 15 that encloses and protects the bellows structure. A carrier 16 of the nonrotating seal face member 17 has a flange 18 defining a recess 18' of internally concave arcuate cross-section and there is a similar annular recess 19 of arcuate cross-section in the inner periphery of the ring 13. Both the ring 13 and the carrier 16 are made up of a number, conveniently three, of arcuate castings bolted together by tangentially extending bolts.

The recesses 18' and 19 receive the ends of the bellows, shown at 20, and clamp them onto respective internally disposed rings 21 and 22. These rings are made up of arcuate sections of tube, the adjacent sections being secured together by tangential bolts 23 in lugs 24 that extend radially inwards from the rings.

The bellows of FIGURE 6 are made up of several layers, as in the construction described above, but in this case they are shaped to have the convex side of the cross-section facing inwards. As in the construction of FIGURE 5 the transition from the curve of the bellows cross-section to the curve of the recesses in which the ends are clamped is smooth and free from stress-raising kinks. The fact that the cross-section is an arc of a circle ensures that the pressure difference across the bellows produces no tendency to distortion of the shape. The composition of the bellows is shown in FIGURE 7 and comprises an inner layer 25 of metal strips, preferably of Monel metal, a spiral wrapping 26 of three turns of polyvinyl chloride fabric, and then five more layers of metal strips 25 alternating with layers of PVC.

It will be appreciated that in all the arrangements described the entire bellows structure can be built up in situ by wrapping it around the shaft, so that it can be taken apart and replaced without access to the end of the shaft, a valuable asset in structures such as marine propeller shaft seals.

I claim:

1. A method of forming an axially flexible fluid-tight bellows connection between first and second mutually axially spaced substantially co-axial hollow cylindrical bodies of similar diameters comprising the steps of forming at least one composite flexible strip in the form of a ladder structure by taking individual transversely extending strips and joining them together in a longitudinal row to form said ladder structure composite flexible strip, shaping said individual strips to an arcuate shape, wrapping said composite flexible strip, after its formation, circumferentially around said bodies so as to bridge between them with the lateral edges of said composite flexible strip overlying circumferentially extending surfaces of said first and second bodies, applying separable axially spaced hoop sections over each of said edges to press said edges against the respective bodies, and circumferentially tensioning said hoops.

2. The method set forth in claim 1 wherein said individual transversely extending strips are shaped to an arcuate shape prior to being joined together to form said composite strips.

3. The method set forth in claim 2 wherein each of said individual strips is shaped to form a central arcuate portion of one curvature and two end portions of opposite curvature, said portions merging smoothly into one another.

4. The method set forth in claim 1 wherein said composite flexible strip comprises two longitudinally extending lateral edge members, and said transversely extending strips are joined together indirectly by securing their ends to said two edge members.

5. The method set forth in claim 1 wherein a plurality of said composite flexible strips, each forming an arcuate segment are assembled around said bodies and are all simultaneously pressed against the bodies by the tightening of said hoops.

6. The method set forth in claim 1 including the further step of circumferentially spiralling wrapping around said bodies, to bridge between them, at least one further flexible strip of sheet material in addition to said composite flexible strip.

7. The method set forth in claim 6 wherein said further strip comprises a fabric-reinforced synthetic resin material.

References Cited

UNITED STATES PATENTS

| | | | |
|---|---|---|---|
| 2,879,804 | 3/1959 | Hammond | 285—229 XR |
| 2,815,795 | 12/1957 | Vander Poel | 156—190 XR |
| 1,345,971 | 7/1920 | Star | 138—121 XR |

EARL M. BERGERT, *Primary Examiner.*

PHILIP DIER, *Examiner.*